(12) United States Patent
Ayyildiz

(10) Patent No.: US 9,706,174 B2
(45) Date of Patent: Jul. 11, 2017

(54) SIGHTING DEVICE

(75) Inventor: Coskun Ayyildiz, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 367 days.

(21) Appl. No.: 14/422,001

(22) PCT Filed: Aug. 14, 2012

(86) PCT No.: PCT/IB2012/054132
§ 371 (c)(1),
(2), (4) Date: Feb. 17, 2015

(87) PCT Pub. No.: WO2014/027218
PCT Pub. Date: Feb. 20, 2014

(65) Prior Publication Data
US 2015/0208038 A1    Jul. 23, 2015

(51) Int. Cl.
| | |
|---|---|
| *H04N 7/18* | (2006.01) |
| *G02B 23/00* | (2006.01) |
| *F41G 1/38* | (2006.01) |
| *G01B 11/00* | (2006.01) |
| *G01J 1/20* | (2006.01) |
| *G06F 15/00* | (2006.01) |
| *F41G 1/473* | (2006.01) |
| *H04N 5/225* | (2006.01) |
| *H04N 5/232* | (2006.01) |

(52) U.S. Cl.
CPC ................. *H04N 7/18* (2013.01); *F41G 1/38* (2013.01); *F41G 1/473* (2013.01); *H04N 5/2251* (2013.01); *H04N 5/23293* (2013.01); *H04N 5/23296* (2013.01)

(58) Field of Classification Search
CPC .. H04N 7/18; G02B 23/00; F41G 1/38; G01B 11/00; G01J 1/20; G06F 15/58
See application file for complete search history.

(56) References Cited

U.S. PATENT DOCUMENTS

| | | |
|---|---|---|
| 4,531,052 A | 7/1985 | Moore |
| 5,389,774 A | 2/1995 | Gelman et al. |
| 6,362,882 B1 | 3/2002 | Choate et al. |
| 2005/0018041 A1 | 1/2005 | Towery et al. |
| 2009/0205239 A1 | 8/2009 | Smith, III |
| 2010/0149634 A1 | 6/2010 | Tang et al. |

*Primary Examiner* — Sath V Perungavoor
*Assistant Examiner* — Patricia I Young
(74) *Attorney, Agent, or Firm* — Gokalp Bayramoglu

(57) ABSTRACT

The present invention relates to a sighting device (1) providing an automatically updated reticule. The control unit (4) acquires the output level of the encoder (22) and calculates the expected distance between the dots of the reticule accordingly. The control unit (4) calculates the expected distance between the dots of the reticule and draws the reticule generated for that specific zoom level on the display means (3).

15 Claims, 1 Drawing Sheet

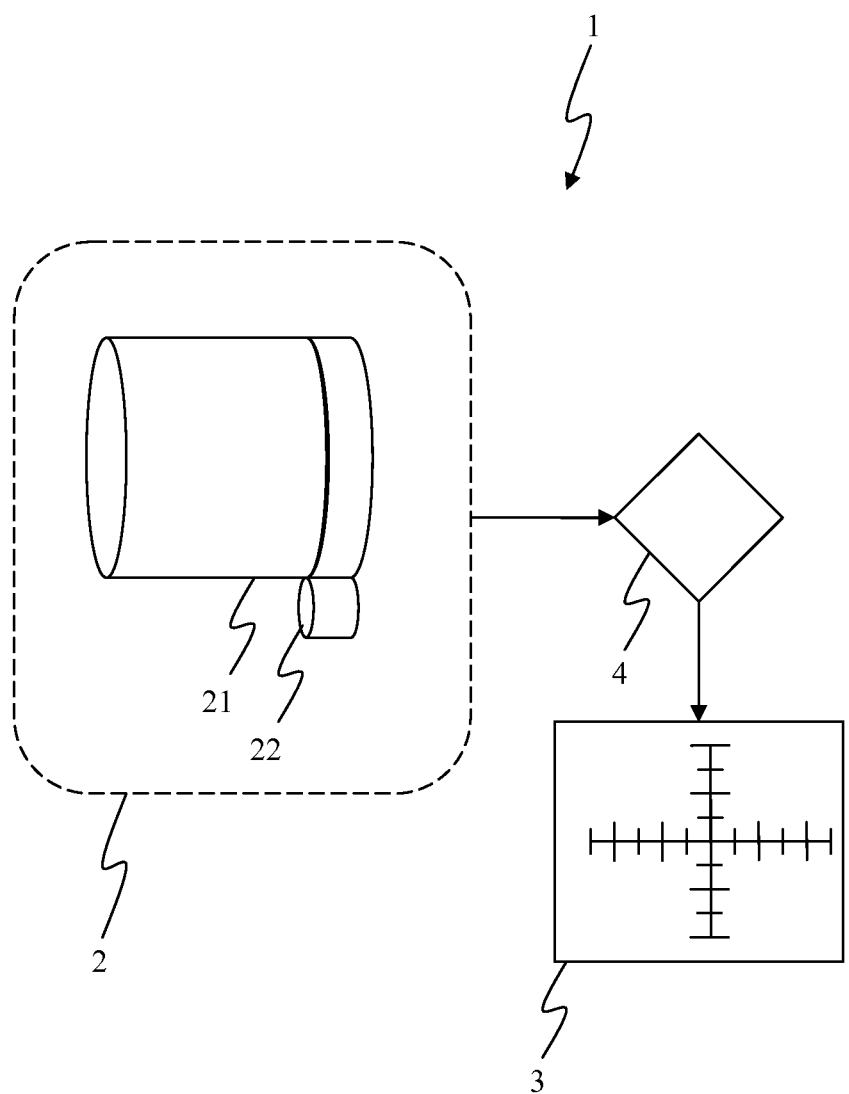

SIGHTING DEVICE

FIELD OF THE INVENTION

The present invention relates to a sighting device providing an automatically updated mil-dot reticule.

BACKGROUND OF THE INVENTION

In order to aim at far away targets, scopes are usually utilized in firearms. These scopes help magnify the view in their sight in order to give a clearer vision of the target. However, this magnification brings along a concession of accuracy. As the scope is used for aiming at far away targets, even a single millimeter deviation of the barrel causes the bullet to deviate dramatically when it reaches the target. In order to increase accuracy in aiming, reticules are utilized. Reticules come in handy when aiming at a far away target as they give a very good idea on how the barrel of the firearm is pointed. However, even the reticules cannot help to aim at very far away targets. When fired, a bullet's trajectory will be affected by the gravity and wind. Thusly, for long flight times, the bullet will noticeably deviate from the center of the reticule. In order to compensate the effect of gravity, the center of the reticule must be shifted upwards from the target aimed.

When using crosshair reticules, the amount of shift in order to compensate the effect of gravity cannot be seen quite clearly as there are no markers, which make seeing the shifted amount possible. In order to overcome this problem, markers have been added to the reticule, which makes determining the shifting amount easier. There are numerous types of markers, one of which utilizes mil-dot.

Mil-dot reticule is a reticule, which utilizes small dots, which are positioned in milliradian intervals. These dots may also be utilized in estimation of the range of target. However, for a scope that has multiple zoom levels, a reticule with a fixed mil-dot interval is not useful as the area spanned by those mil-dots are different between the zoom levels.

There are scopes, which have separate mil-dot reticules with different separations between the mil-dots for every constant zoom level. However, for continuous zoom systems, having a separate mil-dot reticule for every single zoom level is not plausible. A different approach for the scopes with continuous zoom has to be used.

The United States patent document numbered U.S. Pat. No. 6,362,882 discloses a reticule projection system for video inspection apparatus.

The United States patent document numbered US 2005018041 discloses an electronic firearm sight, and method of operating same.

OBJECTS OF THE INVENTION

The object of the invention is to provide a sighting device utilizing continuous zoom.

A further object of the invention is to provide a sighting device comprising a mil-dot reticule, which is generated according to the zoom level.

DETAILED DESCRIPTION OF THE INVENTION

A sighting device in order to fulfill the objects of the present invention is illustrated in the attached FIGURE, where:

FIG. 1 is the schematic representation of the sighting device.

Elements shown in the figures are numbered as follows:
1. Sighting device
2. Imaging means
21. Zooming means
22. Encoder
3. Display means
4. Control unit A sighting device (1) comprises;
- at least one imaging means (2) which acquires images from the scene to be watched comprising at least one zooming means (21) which enables the user to change the level of magnification according to users' preferences and at least one encoder (22) enabling the magnification level of the zooming means (21) to be determined,
- at least one display means (3) which enables the user to see the scene viewed by the imaging means (2),
- at least one control unit (4) which acquires the output level of the encoder (22), calculates the expected distance between the dots of the reticule and places the reticule over the image being displayed at the display means (3).

In the preferred embodiment of the invention, the zooming means (2) provide continuous zoom, meaning that the magnification level can be changed gradually instead of jumping from one predefined magnification level to another.

The subject matter of invention comprises at least one imaging means (2) which acquires images from the scene to be watched. User points the imaging means (2) so that a desired scene is in the field of view of the imaging means (2). The imaging means (2) comprises at least one zooming means (21). If the scene to be viewed is far away from the user and hence the sighting device (1) then the user may utilize the zooming means (21) in order to magnify the scene viewed by the imaging means (2). In the preferred embodiment of the invention, the zooming means (21) is utilized by turning a ring (zoom ring) manually or by means of a motor attached to that ring. The subject matter of invention comprises at least one encoder (22) output value of which is related to the magnification level of the zooming means (2). The encoder (22) can be coupled with either the zoom ring or the motor. If the encoder (22) is coupled with the ring, the output of the encoder (22) changes according to the change of position of the ring. If the encoder (22) is coupled with the motor, the output of the encoder (22) changes as the motor turns. The level of the magnification then can be determined using the correlation between the output value of the encoder and the magnification level. The subject matter of invention comprises at least one control unit (4), which calculates the expected distance between the dots of the reticule and places the reticule over the image being displayed at the display means (3). The control unit (4) acquires the output value and hence the value of magnification level from the encoder (22). Control unit (4) then calculates the expected value of the distance between the dots of the reticule using the acquired encoder value and the resolution of the display means (3).

In the preferred embodiment of the invention, the distance between the dots of the reticule is calculated as follows:

$$D = \frac{(A \times 360)}{(6400 \times n)}$$

wherein A is the horizontal resolution value of the display means (3), n is the angle of view and D is the distance between the dots of the reticule. If the horizontal resolution value of the display means (3) is given in pixels then the distance between the dots of the reticule is also in pixels. The calculations can be adapted for different length measures such as millimeters, centimeters, inches etc. However, in that case, as the unit length in an imaging device (3) is 1 pixel, a relation between the other units and pixels has to be determined. The control unit (4) calculates the expected distance between the dots of the reticule and draws the reticule generated for that specific zoom level on the display means (3).

As the distance between the dots and hence reticule is recalculated whenever the zoom level is changed, the user can estimate the distance accurately even if he changes the zoom level.

In one embodiment of the invention, encoder (22) is analog. Meaning that, for every position of the ring or motor it gives a separate analog output.

In another embodiment of the invention, encoder (22) is digital. In this embodiment, the output of the encoder can be either serial or parallel. If the output of the encoder (22) is parallel then the control unit (4) reads the output of the encoder (22) which is a binary number that refers to the position of the encoder (22) thus the zooming means (21). If the output of the encoder (22) is serial, then the encoder (22) gives out peaks while the zoom ring turns. That is to say, according to the structure of the encoder (22), it may give one peak per one degree, two peaks per one degree and such. However, in that case, instead of being able to determine the position of the encoder (22) right away, control unit (4) counts the number of peaks and then calculates the position of the encoder (22) thus the zooming means (21).

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A sighting device comprising;
at least one imaging means which acquires images from a scene to be watched comprising at least one zooming means which enables a user to change a level of magnification according to the users' preferences;
at least one display means which displays the scene viewed by the imaging means;
at least one control unit comprising a processor which calculates a shooting distance between neighboring dots of the display means and places a reticule over the scene being displayed at the display means;
wherein the imaging means further comprises at least one encoder enabling a magnification level of the zooming means to be determined;
wherein the control unit which comprises a processor and acquires an output level of the encoder and calculates the shooting distance between the neighboring dots of the display means according to following formula:

$$D = \frac{(A \times 360)}{(6400 \times n)}$$

wherein A is a horizontal resolution value of the display means, n is an angle of view and D is a distance between the dots of the reticule according to an acquired output level of the encoder.

2. The sighting device according to claim 1, wherein the zooming means is utilized by turning a ring (zoom ring) manually or by means of a motor attached to the ring.

3. The sighting device according to claim 1, wherein the zooming means provide continuous zoom.

4. The sighting device according to claim 1, wherein the encoder is analog.

5. The sighting device according to claim 1, wherein the encoder is digital.

6. The sighting device according to claim 5, wherein the output of the encoder is a binary number that refers to the position of the encoder thus and the zooming means.

7. The sighting device (1) according to claim 5, wherein the output of the encoder is peaks which are acquired while the zoom ring turns.

8. The sighting device according to claim 7, wherein the control unit comprises a processor which counts the peaks outputted by the encoder and calculates the position of the encoder and the position of the zooming means.

9. The sighting device according to claim 2, wherein the zooming means provide continuous zoom.

10. The sighting device according to claim 2, wherein the encoder is analog.

11. The sighting device according to claim 3, wherein the encoder is analog.

12. The sighting device according to claim 9, wherein the encoder is analog.

13. The sighting device according to claim 2, wherein the encoder is digital.

14. The sighting device according to claim 3, wherein the encoder is digital.

15. The sighting device according to claim 9, wherein the encoder is digital.

* * * * *